H. H. BROOMHEAD.
LOCK FOR AUTOMOBILE STEERING GEAR.
APPLICATION FILED JAN. 15, 1920.
1,349,490.
Patented Aug. 10, 1920.
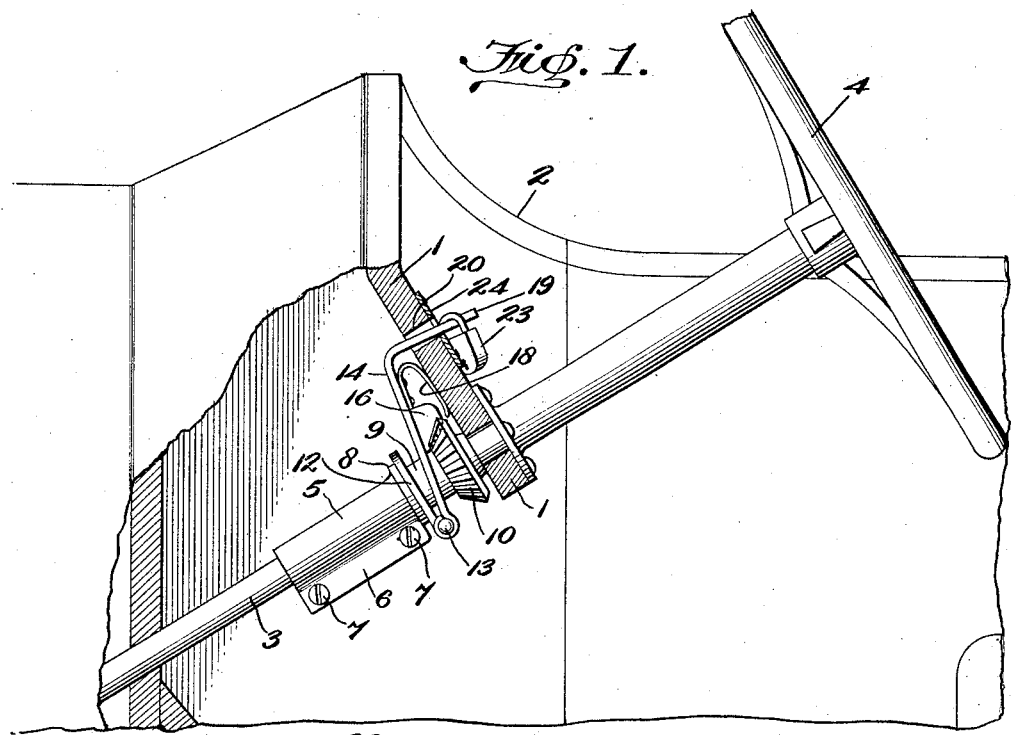
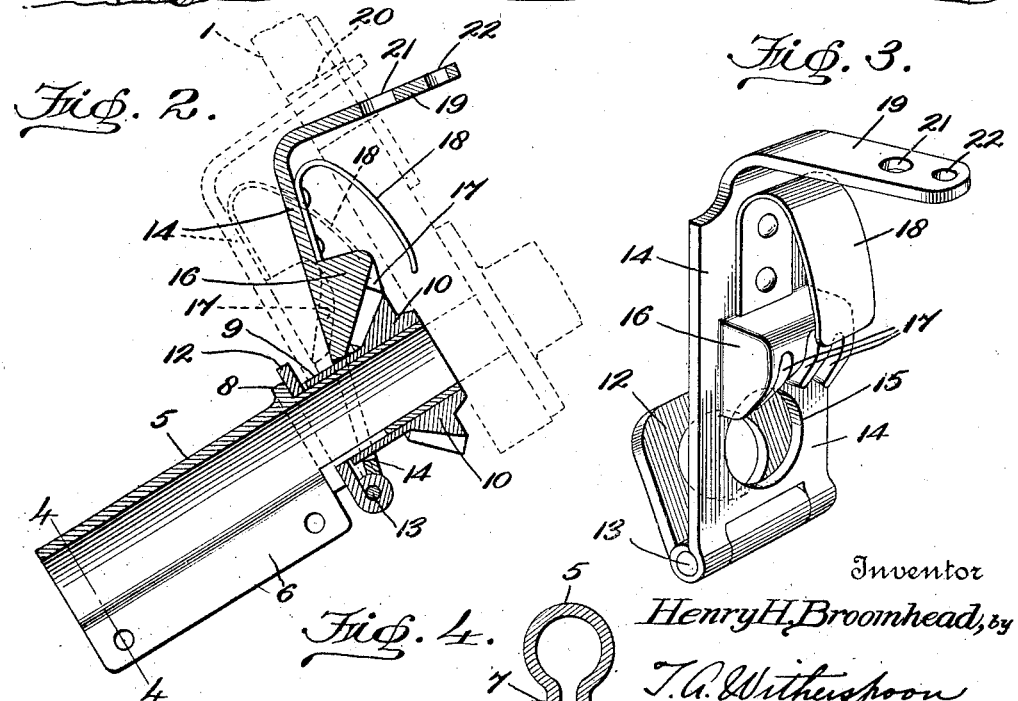
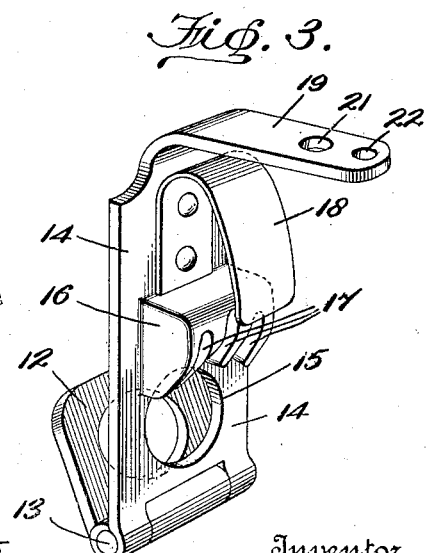
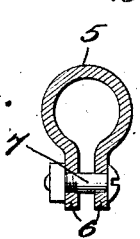
Inventor
Henry H. Broomhead, by
T. A. Witherspoon
Attorney

UNITED STATES PATENT OFFICE.

HENRY H. BROOMHEAD, OF BLOOMINGTON, IDAHO.

LOCK FOR AUTOMOBILE STEERING-GEAR.

1,349,490.  Specification of Letters Patent.  Patented Aug. 10, 1920.

Application filed January 15, 1920. Serial No. 351,573.

*To all whom it may concern:*

Be it known that I, HENRY H. BROOMHEAD, a citizen of the United States, residing at Bloomington, in the county of Bear Lake and State of Idaho, have invented certain new and useful Improvements in Locks for Automobile Steering-Gear; and I do hereby declare the following to be a full, clear, and exact description of the invention, such as will enable others skilled in the art to which it appertains to make and use the same.

This invention relates to locking means for automobile steering mechanism and has for its object to provide a device of this character which will be simple in construction, comparatively inexpensive to manufacture, and more efficient in action than those heretofore proposed.

With these and other objects in view the invention consists in the novel details of construction and combinations of parts more fully hereinafter disclosed and particularly pointed out in the claims.

Referring to the accompanying drawings, forming a part of this specification, in which like numerals designate like parts in all the views:—

Figure 1 is an elevational view, partly broken away, of an automobile steering column, showing the present invention applied thereto;

Fig. 2 is a central vertical sectional view of the device shown in Fig. 1, detached from the steering column, a portion of the dash or instrument board, however, being shown in dotted lines;

Fig. 3 is a perspective view of a portion of the parts shown in Fig. 2; and

Fig. 4 is a transverse sectional view taken on the line 4—4 of Fig. 2.

1 indicates the usual dash or instrument board of a motor vehicle 2, through which passes the steering post 3, carrying at its upper end the steering wheel 4. Mounted upon the said steering post 3, preferably below or behind the board 1, is a split sleeve member 5, provided with the ears 6, bolts 7, whereby the said sleeve member may be clamped upon the said post 3. The said sleeve member 5 is provided with a shoulder 8, and with a reduced portion which fits an extension 9 upon which is rigidly mounted a toothed member or gear 10, as will be clear from Figs. 1 and 2 of the drawings.

Loosely mounted upon the extension 9, adjacent the shoulder 8, is a plate 12 to which is pivoted as at 13, the hasp-like member 14. This said member 14 is provided with an opening 15 to accommodate the extension 9, as shown in said figures, and also with a boss or lug 16 in which are cut one or more notches or teeth 17, adapted to engage with the teeth of the gear 10, as will be readily apparent.

A suitable spring 18 is secured to the said member 14 and bears against the board 1, to normally keep the members 10 and 16 out of engagement, and a portion 19 of the member 14 is bent at substantially a right angle to the main portion, whereby it is adapted to normally enter and project through an opening 20 cut in the board 1.

The said angularly disposed portion 19 of the member 14 is provided with a plurality of openings such as 21 and 22, adapted to accommodate the lock 23, see Fig. 1. 24 designates an escutcheon plate surrounding the hole 20.

The operation of the invention will be clear from the foregoing, but may be briefly summarized as follows:—

When the machine is in use, the parts will normally occupy the positions shown in dotted lines in Fig. 2, i. e., the lock 23 is removed, whereupon the spring 18 will force the member 14 to the left as seen in said Fig. 2, disengaging the teeth 17 of the lug 16 from the teeth of the gear 10, thus leaving the steering post 3 entirely free to move in response to the wheel 4. When, however, it is desired to prevent the theft or unauthorized use of the car during the owner's absence, the angularly disposed portion 19 of the member 14 is grasped and pulled to the right as seen in the said Fig. 2, to substantially the full line position shown therein, thereby causing the engagement of the teeth 17 with the teeth of the gear 10. Since the said gear is rigidly connected to the steering post 3, any attempted movement of the said post will be transmitted to the said gear and from it to the teeth 17 and member 14, which will cause the said member 14 to attempt to move about the axis of the steering post.

The angularly disposed portion 19 of the said member 14, will however, take against the side of the opening 20 in the instrument board, thereby preventing rotation thereof, and consequently of the steering post 3 and wheel 4.

It will of course be obvious that the steering gear can be set and locked either so that the car may only be run in a straight line, or in a circle. In either case, however, the unauthorized use or theft of the car will be defeated.

It is obvious that those skilled in the art may vary the details of construction, as well as the arrangement of parts without departing from the spirit of the invention, and therefore, I do not wish to be limited to the above disclosure except as may be required by the claims.

What I claim is:—

1. In a device of the class described the combination of a steering post of a motor vehicle; a toothed means adapted to be rigidly associated with said post; a flat perforated plate surrounding said post; a bent member hinged to said plate provided with a toothed member adapted to engage and disengage said first named toothed means to prevent a movement thereof; spring means rigid with said bent member adapted to normally maintain said toothed means and said bent member out of engagment; and means adapted to positively maintain said first and second named means in engagement against the action of said spring means, substantially as described.

2. In a locking means for automobile steering mechanism, the combination of a sleeve adapted to be secured to the steering post; a toothed member rigid with said sleeve; a plate member carried by said sleeve; a member bent at an angle to itself pivoted to said plate member, and having a lug member adapted to engage said toothed member; and said bent member adapted to engage a non-rotating part of the vehicle, whereby rotation of the parts may be prevented; and means comprising a spring carried by said bent member adapted to normally maintain said lug and toothed members out of engagement, substantially as described.

3. In a locking means for automobile steering mechanism the combination of a split sleeve adapted to be clamped to the steering post; a toothed gear rigid with said sleeve; a plate member loosely mounted upon said sleeve; a hasp-like member pivoted to said plate member, having a notched lug adapted to engage and disengage said gear, said hasp-like member being also provided with an angularly disposed extension adapted to engage a non-rotating part of the vehicle to prevent rotation of the parts; a spring adapted to normally maintain said lug and gear out of engagement; and means adapted to coact with said angular extension to hold said lug and gear in engagement against the action of said spring, substantially as described.

In testimony whereof I affix my signature.

HENRY H. BROOMHEAD.